US009054598B2

(12) United States Patent
Rantanen

(10) Patent No.: US 9,054,598 B2

(45) Date of Patent: Jun. 9, 2015

(54) FREQUENCY CONVERTER

(75) Inventor: Jussi Rantanen, Espoo (FI)

(73) Assignee: ABB OY, Helsinki (FI)

( * ) Notice: Subject to any disclaimer, the term of this patent is extended or adjusted under 35 U.S.C. 154(b) by 450 days.

(21) Appl. No.: 12/887,878

(22) Filed: Sep. 22, 2010

(65) Prior Publication Data

US 2011/0069520 A1 Mar. 24, 2011

(30) Foreign Application Priority Data

Sep. 24, 2009 (FI) ..................................... 20095982
Sep. 24, 2009 (FI) ..................................... 20095983

(51) Int. Cl.

| | |
|---|---|
| ***H02M 5/00*** | (2006.01) |
| ***H02M 5/45*** | (2006.01) |
| *G05B 11/01* | (2006.01) |
| *G05B 19/042* | (2006.01) |
| *H02J 9/00* | (2006.01) |
| *H02M 1/36* | (2007.01) |

(52) U.S. Cl.

CPC ............. *H02M 5/45* (2013.01); *G05B 19/0423* (2013.01); *H02J 2009/007* (2013.01); *H02M 1/36* (2013.01)

(58) Field of Classification Search

USPC .......... 363/1–12, 157–177; 318/606, 607, 78, 318/147, 723, 807, 827, 503; 380/1–261
See application file for complete search history.

(56) References Cited

U.S. PATENT DOCUMENTS

| | | | | |
|---|---|---|---|---|
| 5,324,990 | A | 6/1994 | Cunningham | |
| 5,723,968 | A * | 3/1998 | Sakurai | 318/802 |
| 6,900,614 | B2 * | 5/2005 | Na | 318/772 |
| 2005/0068001 | A1 * | 3/2005 | Skaug et al. | 318/807 |
| 2005/0128666 | A1 | 6/2005 | Pogodayev et al. | |
| 2006/0241794 | A1 * | 10/2006 | Burkatovsky | 700/87 |
| 2007/0220186 | A1 * | 9/2007 | Rantanen et al. | 710/58 |
| 2008/0310206 | A1 * | 12/2008 | Kangas | 363/170 |

FOREIGN PATENT DOCUMENTS

| | | | |
|---|---|---|---|
| CN | 1129371 | A | 8/1996 |
| CN | 1812251 | A | 8/2006 |
| EP | 0 813 131 | A1 | 12/1997 |
| FI | 20075418 | A | 12/2008 |
| JP | 4-112616 | A | 4/1992 |

OTHER PUBLICATIONS

Finnish Search Reports dated Jul. 23, 2010 and Jul. 28, 2010.

Official Action issued in corresponding Chinese Patent Application No. 201010290749.6, dated Feb. 8, 2013 with English Translation (15 pgs.).

* cited by examiner

*Primary Examiner* — Eduardo Colon Santana
*Assistant Examiner* — Said Bouziane
(74) *Attorney, Agent, or Firm* — Buchanan Ingersoll & Rooney PC

(57) ABSTRACT

A frequency converter includes a housing, a frequency conversion component installed in the housing, a controller that controls the frequency conversion component, and a user interface that transmits control commands from a user to the controller. The controller of the frequency converter are provided with a load examination function that examines whether a load is connected to an output of the frequency conversion component, the controller raising an output frequency of the frequency conversion component to a desired value in response to a load connected to the frequency conversion component and detected by the load examination function.

14 Claims, 2 Drawing Sheets

16' 8' 83' 6' 10' 12' 18' M 4' 2'

FREQUENCY CONVERTER

RELATED APPLICATIONS

This application claims priority under 35 U.S.C. §119 to Finnish Patent Application No. 20095982 filed in Finland on Sep. 24, 2009 and Finnish Patent Application No. 20095983 filed in Finland on Sep. 24, 2009, the entire contents of which are hereby incorporated by reference in their entirety.

FIELD

The disclosure relates to a frequency converter, such as a frequency converter installed in a housing and including a controller and a user interface.

BACKGROUND INFORMATION

Occasional users of conventional frequency converters can find them to be complex and difficult to use.

An object of the disclosure is to provide a frequency converter enabling the above-mentioned problem to be alleviated.

SUMMARY

An exemplary embodiment is directed to a frequency converter is disclosed that includes a housing and frequency converter means installed in the housing. The frequency converter also includes control means for controlling the frequency converter means, and user interface means for transmitting control commands from a user to the control means. The control means of the frequency converter includes a load examination function during use of which the control means examines whether a load is connected to an output of the frequency converter means, and raises an output frequency of the frequency converter means to a desired value in response to a load connected to the frequency converter means and detected by the load examination function. The control means also includes a plurality of load types where one load type is selected at a time for use, and a control response list which, for each load type, determines a response of the control means to different control commands received from the user interface means.

BRIEF DESCRIPTION OF THE DRAWINGS

The exemplary embodiments of the disclosure are described in greater detail with reference to the accompanying drawings, in which.

DETAILED DESCRIPTION

The frequency converter according to an exemplary embodiment of the disclosure can employ advanced algorithms. The feature results in a more advanced device than conventional frequency converters that include a couple of buttons and a potentiometer that appeared on the market some time ago.

An idea underlying the disclosed embodiments relates to a control function of the frequency converter which can execute a load examination function that determines whether a load is connected to the output of the frequency converter. When the load examination function detects a load, the frequency converter raises the output frequency automatically to a desired value.

An advantage of the disclosed frequency converter is that the user interface of the frequency converter can be very simple. This makes the frequency converter easy to use.

In exemplary embodiments described herein, the load examination function can be configured to switch on automatically in response to connecting the frequency converter to a supply network. This configuration can make it unnecessary for the user interface to comprise even a start button.

Figure 1:
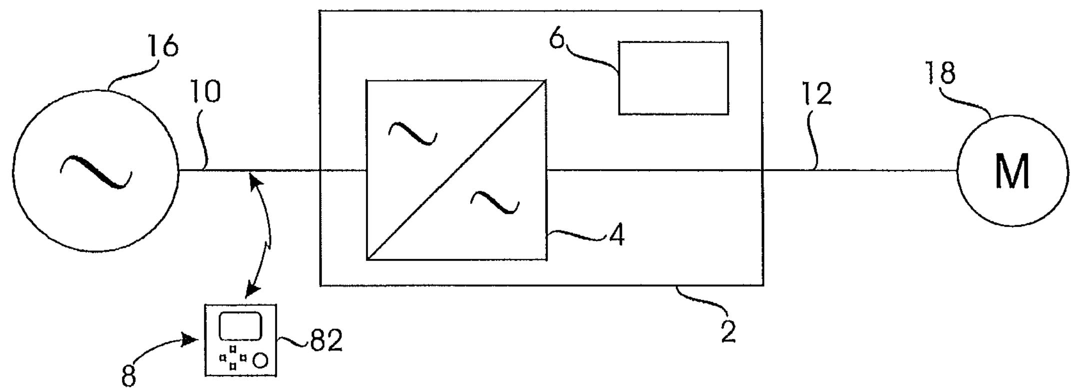
FIGS. 1 and 2 illustrate a frequency converter provided with a separate user interface unit.

The frequency converter shown in FIG. 1 includes a housing 2, frequency conversion means, such as a converter 4, for converting the frequency of electricity. The frequency converter also includes control means, such as a controller 6, for controlling the frequency conversion means 4, and interface means, such as a user interface 8, for transmitting the control commands from a user to the control means 6.

The frequency conversion means 4 can include an input connection for receiving input-frequency electric power, and an output connection for outputting output-frequency electric power.

The control means 6 is provided with a load examination function that can be configured to examine whether a load is connected to an output of the frequency converter means 4. The control means 6 can also raise an output frequency of the frequency conversion means 4 to a desired value in response to a load connected to the frequency conversion means 4 and detected by the load examination function. The load can be connected to the frequency conversion means by connecting a contact plug of the load to the output of the frequency converter, or by pressing a start button of the load connected to the output of the frequency converter.

In an exemplary embodiment, the load examination function can be switched on automatically in response to the frequency converter being switched on. The frequency converter can also be switched on once being connected to a supplying plug contact. In an alternative embodiment, the load examination function can be switched on in response to a separate start-up command given by the user via user interface 8.

During the load examination function, the control means 6 can generate voltage pulses and provide them to the output of the frequency conversion means 4. The detection of a load connected to the frequency conversion means 4 can include detecting whether the voltage pulses generate an electric current at the output of the frequency conversion means 4. In FIG. 1, the load of the frequency converter includes a motor 18 connected to the frequency conversion means 4 via a motor cable 12.

The controller 6 can include memory that stores a plurality of load types and a control response list. One load type, of the plural load types can be selected for use at a time as desired. For each load type, the control response list can determine a response of the controller 6 to different control commands received from the user interface 8, i.e. a manner in which the controller 6 controls the frequency conversion means 4 in response to each control command. The control response list has different content for each load type, which means that the frequency converter reacts to control commands in a different manner, depending on which load type has been selected.

The load types stored in advance in the controller 6 can include a pump, a fan, an irrigation system, a concrete mixer, a firewood splitter, and a circular saw. The controller 6 can control the frequency conversion means 4 in a manner which is optimal for the power supply of the selected load type. When the selected load type is a fan, for example, the controller 6 can control the frequency conversion means 4 in a manner which is optimal for the power supply of the fan.

In another exemplary embodiment, the number of load types stored in advance in the controller 6 can differ from those types given in the above-described example. The controller 6 can also store load types other than those disclosed above. The list of stored load types can include one or more of the aforementioned load types, and/or one or more other load types.

For each load type, the control response list identifies a response of the controller 6 to each control command, such as a switch-off command, a reversing command, and a stepping command. In an exemplary embodiment where the frequency conversion means 4 starts the power supply based on a separate start-up command, for each load type the control response list identifies a response of the controller 6 to the start-up command. Special properties of each load type can be taken into account when establishing the control response list.

In an exemplary embodiment, the controller 6 can raise the frequency of the frequency conversion means 4 to a desired frequency in response to a load detected by the load examination function. This operation can depend on the load type selected for use. In another exemplary embodiment, through the user interface 8, the control means can be set to raise the frequency converter to the desired frequency in response to a load detected by the load examination function. It is also possible to combine features of the aforementioned embodiments, in which case both the load type and the user interface 8 influence the desired frequency value to which the controller 6 raises the frequency of the frequency conversion means 4 in response to a load detected by the load examination function.

In a frequency converter according to another exemplary embodiment, the load type can be set to a default value for a desired frequency value. The default value can be changed through the user interface 8. In yet another exemplary embodiment, the load type can be set to establish a lower limit for a desired frequency value, in which case the desired frequency value is a value to which the frequency of the frequency converter is to be raised.

Another exemplary embodiment provides that a desired frequency value for the frequency conversion means 4 can be input through the user interface 8 and raises the output frequency to a value determined by the load type once the load has been detected. Thereafter the user interface 8 can be used to input a desired frequency to which the frequency of the frequency is converter to be raised or lowered.

The frequency converter raises the output frequency to a desired value smoothly. Therefore, slow fuses can be omitted in the supplying network. The smoothness of a rise in frequency can depend on the selected load type. Further, it is possible that at least in the case of certain load types, in addition to the output frequency, the controller 6 can smoothly raise the output voltage to a desired value in response to a load connected to the frequency conversion means 4 and detected by the load examination function. The smoothness of a use frequency and/or voltage means that an initial frequency value under consideration increases gradually, and a final frequency value is achieved after a certain delay. The smoothness of a use in frequency and/or voltage may depend on the selected load type.

In other exemplary embodiments, the control response list can include separate commands for a slow and a fast start-up, a slow and a fast reversing command, and a slow and fast stepping, etc. In order for a user of the frequency converter to utilize all functions specified in the control response list, the user interface 8 should support the desired functions. If a user interface 8 is classified under a specified frequency converter product line and the design is to be kept extremely simple, the user interface 8 can be configured to support desired basic functions, even if the control means is configured to support additional functions.

Figure 2:
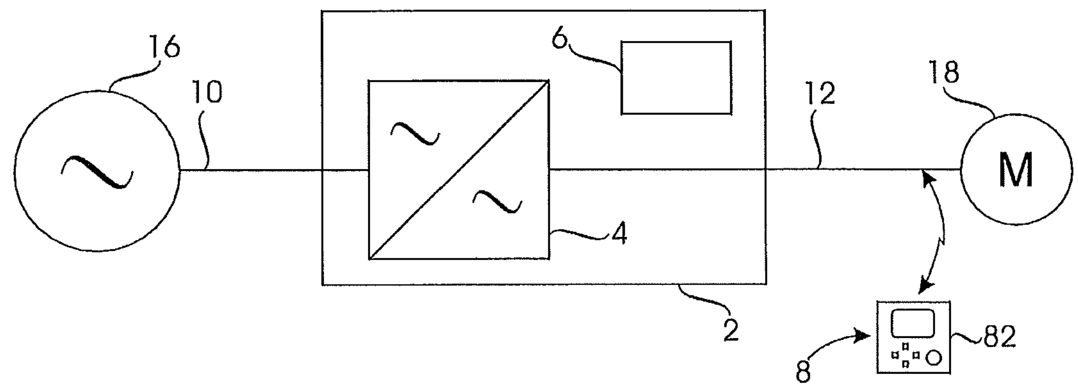

The user interface 8 of the frequency converter shown in FIGS. 1 and 2 includes a separate user interface unit 82, which is movable with respect to the housing 2. The separate user interface unit 82 can be connected by inductive coupling to a cable of the frequency converter in order to transmit control commands from the separate user interface unit 82 to the controller 6 via the cable.

In FIG. 1, for example, the separate user interface unit 82 is coupled by inductive coupling to a supply cable 10 of the frequency converter, the supply cable 10 being arranged to transfer electric power between a supplying electrical power network 16 and the frequency conversion means 4.

In FIG. 2, for example, the separate user interface unit 82 is coupled by inductive coupling to a motor cable 12 of the frequency converter, the motor cable 12 being arranged to transfer electric power between the frequency conversion means 4 and the motor 18.

Figure 3:
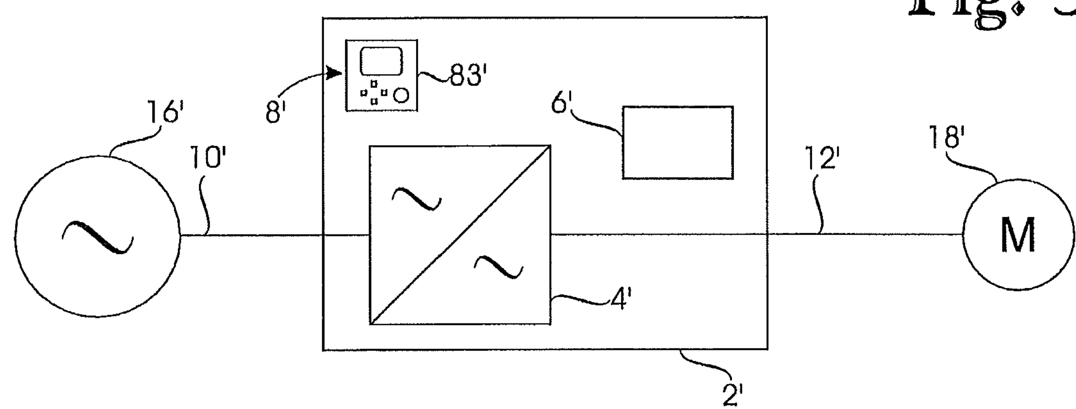
FIG. 3 illustrates a frequency converter provided with a fixed user interface unit according to an exemplary embodiment.

FIG. 3 schematically illustrates an exemplary frequency converter provided with a fixed user interface unit 83'. The fixed user interface unit 83' is installed in the housing 2' of the frequency converter.

Both the separate user interface unit and the fixed user interface unit can include one or more operating switches for enabling the user to provide control commands to the frequency converter by depressing these switches. In embodiments where the structure of the user interface has a more complex design, the user interface unit can include a display. The display can be a touch screen, in which case one or more operating switches can be implemented on the touch screen.

Figure 4A:
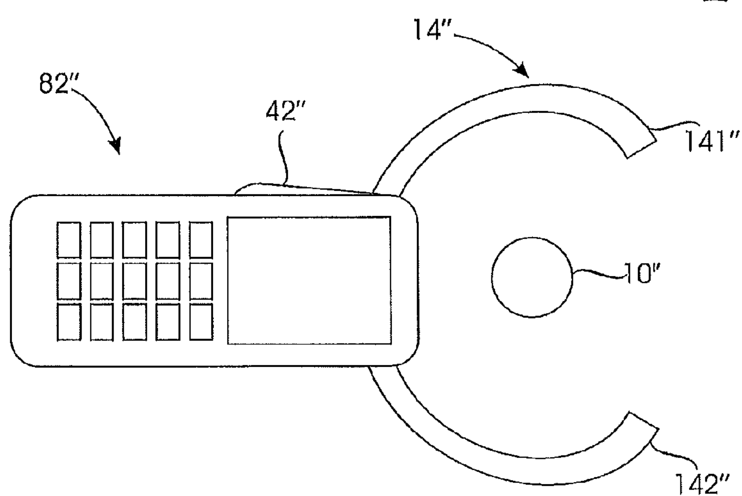
FIGS. 4A and 4B illustrate a separate user interface unit according to an exemplary embodiment.
Figure 4B:
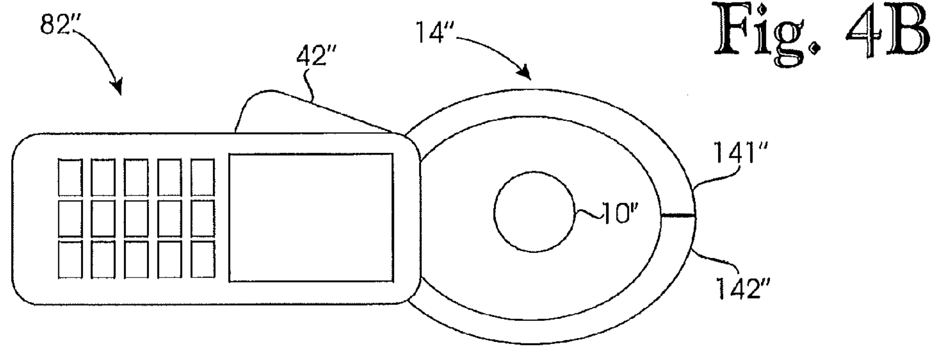

FIGS. 4A and 4B schematically illustrate a separate user interface unit 82" according to an exemplary embodiment. The user interface unit 82" can be connected by an inductive coupling to the cable of the frequency converter and control the frequency converter means 4 by means of control signals. The separate user interface unit 82" can include a signal connection means 14" that can transmit control signals from the separate user interface means 82" to the cable of the frequency converter. The signal connection means 14" can include an openable induction loop which has an open position and a closed position, the open position being arranged for placing the openable induction loop around the cable and the closed position being arranged for feeding control signals to the cable of the frequency converter located inside the openable induction loop. In FIG. 4A, the openable induction loop of the signal connection means 14" is illustrated in an open position, and in FIG. 4B the openable induction loop is illustrated in a closed position.

The separate user interface unit 82" can include an actuator 42" which enables the user to open jaws 141" and 142" of the openable induction loop by pressing the actuator 42". In FIG. 4A, the jaws 141" and 142" of the openable induction loop are shown in an open position, where a distance between the tips of the jaws 141" and 142" is substantially greater than a diameter of the supply cable 10". In FIG. 4B, the jaws 141" and 142" of the openable induction loop are shown in a closed position, and the supply cable 10" resides inside the induction loop formed by the jaws 141" and 142", enabling control signals to be fed inductively to the supply cable 10".

The frequency converter described herein can be connected directly to a plug contact, in which case the contact plug is integrated in the housing of the frequency converter. Alternatively, a supply cable can be provided between the plug contact and the housing of the frequency converter. Both the supply cable and the motor cable can be either a cable fixedly connected to the housing or a detachable cable.

In an exemplary embodiment , the protection class of the frequency converter is high, at least IP66. Such a frequency converter with a high protection class can be adjusted to be used as a movable frequency converter that can be used, for example, on construction sites in dirty and wet conditions.

In another exemplary embodiment a load type of a frequency converter can be pre-selected in connection with a manufacture or commissioning of the frequency converter such that a user cannot change the load type through the user interface 8. The frequency converter can be thus configured to feed a similar load throughout its entire operating life. The load type can be indicated, for example, on the housing of the frequency converter, whereby anyone using the frequency converter can identify the type of load for which the frequency converter is optimized. The frequency converters according to this embodiment, which are intended for different load types, can be manufactured on the same production line, since all their components are identical. After the load type has been selected, the housing of the frequency converter can be provided with a label to indicate that the frequency converter is, for example, a pump frequency converter or a fan frequency converter. In an alternative embodiment, the user interface means can enable the load type to be changed.

It should be obvious to a person skilled in the art that the basic idea of the disclosure can be implemented in many different ways. This disclosure and its exemplary embodiments are thus not restricted to the above examples but may vary within the scope of the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A frequency converter comprising:

a housing;

frequency conversion means installed in the housing;

control means for controlling the converter; and interface means for transmitting commands from a user to the control means, wherein the control means includes a load examination function to detect whether a load is connected to an output of the frequency conversion means by generating voltage pulses to the output of the frequency converter means and detecting whether the load is connected to the output of the frequency converter means based on whether the voltage pulses generate an electric current at the output of the frequency converter means, and the control means raises an output frequency of the frequency conversion means to a desired value in response to the detection of the load connected to the frequency conversion means and examined by the load examination function; and wherein the control means stores a plurality of load types and a control response list where one load type at a time is selected for use and for each load type, the control response list identifying a response of the control means to different control commands received from the interface means, and the control response list is used for determining a response of the control means to at least one of a switch-off command, a reversing command and a stepping command, wherein the control response list has different contents for different load types such that the control means controls the frequency conversion means differently depending on the load type in accordance with the control response list.

2. The frequency converter as claimed in claim 1, wherein the load examination function is switched on automatically in response to the frequency converter being switched on.

3. The frequency converter as claimed in claim 1, wherein the interface means sets a desired frequency value to which the control means raises the frequency of the frequency converter means in response to a load detected by the load examination function.

4. The frequency converter as claimed in claim 1, wherein for each load type, the control response list determines a response of the control means to a load detected by the load examination function.

5. The frequency converter as claimed in claim 1, wherein the load types stored in the control means include at least one of a pump, a fan, an irrigation system, a concrete mixer, a firewood splitter, and a circular saw.

6. The frequency converter as claimed in claim 1, wherein the selected load type determining a desired frequency value to which the control means is configured to raise the frequency of the frequency converter means in response to a load detected by the load examination function.

7. The frequency converter as claimed in claim 1, wherein the load type is preselected in connection with a manufacture or commissioning of the frequency converter such that the user cannot change the load type by the user interface means.

8. The frequency converter as claimed in claim 1, wherein the user interface means comprises a separate user interface unit which is movable with respect to the housing and which is inductively coupled to a supply cable or a motor cable of the frequency converter for transmitting control commands to the control means via the supply cable or the motor cable.

9. The frequency converter as claimed in claim 1, wherein a protection class of the frequency converter is at least IP66.

10. A frequency converter comprising:

a converter that converts an input frequency to a desired output frequency; and a controller that (i) determines whether a load is connected to an output of the converter by generating voltage pulses to the output of the converter and detecting whether the load is connected to the output of the converter based on whether the voltage pulses generate an electric current at the output of the converter means, and (ii) adjusts the output frequency of the converter based on the detection of the load connected to the converter, by identifying a load type for the connected load determining a response of the controller based on the identified load type, and a control response list, where one load type at a time is selected for use and for each load type, the control response list identifying a response of the control means to different control commands received from the interface means, and the control response list being used for determining a response of the control means to at least one of a switch-off command, a reversing command and a stepping command, wherein the control response list has different contents for different load types such that the controller is configured to control the converter differently depending on the load type in accordance with the control response list.

11. The converter of claim 10, comprising:

a user interface that is connected to send commands to the controller.

12. The converter of claim 11, wherein the controller includes memory for storing plural load types and the control response list.

13. The converter of claim 12, wherein the controller executes a function based on a selected load type and a response for the selected load type identified in the control response list.

14. A method of frequency conversion, comprising:

determining whether a load is connected to an output of a frequency converter by generating voltage pulses to the output of the frequency converter and detecting whether the load is connected to the output of the frequency converter based on whether the voltage pulses generate an electric current at the output of the frequency converter; and adjusting an output frequency of the frequency converter based on the detected load by identifying a load type for the connected load determining a response of the controller based on the identified load type, and a control response list, where one load type at a time is selected for use and for each load type, the control response list identifying a response of the control means to different control commands received from the interface means, and the control response list being used for determining a response of the determining to at least one of a switch-off command, a reversing command and a stepping command, wherein the control response list has different contents for different load types, and wherein the adjusting comprises controlling the frequency converter differently depending on the load type in accordance with the control response list.

* * * * *